(12) United States Patent
Matsunaga et al.

(10) Patent No.: US 9,318,792 B2
(45) Date of Patent: Apr. 19, 2016

(54) METHOD FOR CONTROLLING ANTENNAS OF MOBILE TERMINAL DEVICE AND SUCH A MOBILE TERMINAL DEVICE

(75) Inventors: Kozo Matsunaga, Yokohama (JP); Takeshi Asano, Atsugi (JP); Masaharu Itoh, Yamato (JP); Kazuo Fujii, Yokohama (JP)

(73) Assignee: Lenovo (Singapore) Pte. Ltd., Singapore (SG)

( * ) Notice: Subject to any disclaimer, the term of this patent is extended or adjusted under 35 U.S.C. 154(b) by 584 days.

(21) Appl. No.: 12/509,125

(22) Filed: Jul. 24, 2009

(65) Prior Publication Data

US 2009/0284438 A1    Nov. 19, 2009

Related U.S. Application Data

(62) Division of application No. 11/445,942, filed on Jun. 3, 2006, now abandoned.

(30) Foreign Application Priority Data

Jun. 3, 2005    (JP) .................................. 2005-164280

(51) Int. Cl.
| | |
|---|---|
| H04M 1/00 | (2006.01) |
| H04B 1/38 | (2015.01) |
| H01Q 1/22 | (2006.01) |
| H01Q 1/24 | (2006.01) |
| H01Q 3/24 | (2006.01) |
| H04B 1/3827 | (2015.01) |

(52) U.S. Cl.
CPC ............. *H01Q 1/2291* (2013.01); *H01Q 1/243* (2013.01); *H01Q 3/24* (2013.01); *H04B 1/3838* (2013.01)

(58) Field of Classification Search
CPC ............................. H04B 1/3838; H01Q 1/243
USPC ......... 455/550.1, 575.7, 103, 272, 277.1, 566
See application file for complete search history.

(56) References Cited

U.S. PATENT DOCUMENTS

| | | | | |
|---|---|---|---|---|
| 5,541,609 | A | * | 7/1996 | Stutzman ............... H01Q 1/245 |
| | | | | 343/702 |
| 6,456,856 | B1 | | 9/2002 | Werling |
| 7,724,705 | B2 | * | 5/2010 | Erola .................... H04W 92/18 |
| | | | | 370/331 |
| 2002/0106995 | A1 | | 8/2002 | Callaway, Jr. |
| 2003/0045246 | A1 | * | 3/2003 | Lee et al. ........................ 455/90 |
| 2003/0124982 | A1 | * | 7/2003 | Saari .................... H04B 7/0689 |
| | | | | 455/67.14 |
| 2003/0148784 | A1 | * | 8/2003 | Sawamura et al. ........... 455/550 |

(Continued)

FOREIGN PATENT DOCUMENTS

| | | |
|---|---|---|
| EP | 1727290 | 2/2004 |
| GB | 2423191 | 8/2006 |

(Continued)

*Primary Examiner* — Nguyen Vo
(74) *Attorney, Agent, or Firm* — Ference & Associates LLC

(57) ABSTRACT

A method for controlling antennas of a mobile terminal device such as a laptop PC and a handheld PC without degrading communication speed or quality and a mobile terminal device having such control are provided. The method comprises determining the usage of the mobile terminal device, determining an antenna to be disabled among the plurality of antennas according to the usage that is determined by the determining of usage, and disabling the antenna which is determined by determining of an antenna to be disabled, wherein the determining of usage determines usage based on the display orientation of the display unit of the mobile terminal device.

20 Claims, 10 Drawing Sheets

(56) References Cited

U.S. PATENT DOCUMENTS

| | | |
|---|---|---|
| 2006/0240866 A1 | 10/2006 | Eilts |
| 2006/0276221 A1 | 12/2006 | Lagnado |

FOREIGN PATENT DOCUMENTS

| | | |
|---|---|---|
| JP | H07-263940 | 10/1995 |
| JP | H11-143604 | 5/1999 |
| JP | 2000-134025 | 12/2000 |
| JP | 2002-290544 | 10/2002 |
| JP | 2003101623 A | 4/2003 |
| JP | 2003-163956 | 6/2003 |
| JP | 2003-283393 | 10/2003 |
| JP | 2003-345497 | 12/2003 |
| JP | 2004-165826 | 6/2004 |
| JP | 2004-282216 | 10/2004 |
| JP | 2004-363863 | 12/2004 |
| JP | 2005084951 A | 3/2005 |
| JP | 2005-303856 | 10/2005 |
| JP | 2006-42118 | 2/2006 |
| WO | 9927610 | 6/1999 |

* cited by examiner

METHOD FOR CONTROLLING ANTENNAS OF MOBILE TERMINAL DEVICE AND SUCH A MOBILE TERMINAL DEVICE

CROSS REFERENCE TO RELATED APPLICATIONS

This application is a divisional application of U.S. patent application Ser. No. 11/445,942, filed Jun. 3, 2006 now abandoned, which claims priority from Japanese Patent Application No. 2005-164280, filed Jun. 3, 2005, both of which are hereby incorporated by reference as if fully set forth herein.

BACKGROUND OF THE INVENTION

The present invention relates to a method for controlling the antennas of a mobile terminal device that has a plurality of antennas, for example. More particularly, the present invention relates to a method for controlling antennas in accordance with the usage of such a mobile terminal device and to such a mobile terminal device.

In recent years, the effects of electromagnetic wave emitted from mobile terminal devices on the human body has been a subject of considerable interest, and technologies for reducing absorption of electromagnetic wave into the human body have become an issue in designing mobile terminal devices. For example, in the United States, a standard has been established that prescribes the acceptable value of Specific Absorption Rate (SAR), which is a measure of electric energy of electromagnetic wave absorbed by the human body, to be under 1.6 W/kg.

In such a circumstance, for a mobile terminal device that has a plurality of antennas for wireless communication, a method has been proposed for always selecting an antenna with better SAR properties for use from the plurality of antenna on such a device. For example, Japanese Unexamined Patent Publication No. 2003-283393 discloses a method for switching between "a first antenna that is designed to obtain preferable SAR properties in all usages" and "a second antenna that is not so designed" and using the selected one in accordance with how a mobile terminal device (e.g., a mobile phone) is being used for the purpose of reducing SAR associated with a mobile terminal device.

Specifically, the method switches between the first antenna and the second antenna according to the usage of the mobile terminal device, such as whether the external data terminal is in use or not, whether handsfree communication is being carried out or not, whether or not the external audio communication terminal is in use, whether the camera is in use or not, whether image communication is being carried out, or whether packet communication is being carried out. In addition, a technique that is based on a method for determining the distance between the mobile terminal device and the human body and a technique based on a method for detecting opening/closing of the housing of the mobile terminal device have been also disclosed. Thus, the method disclosed by Japanese Unexamined Patent Publication No. 2003-283393 is intended to improve SAR properties while avoiding degradation of communication speed and quality of a mobile terminal device as much as possible.

However, another issue arises when such a method is applied to a laptop PC or handheld PC, for example.

More specifically, a mobile phone can have various usages, that is, a mobile phone may be used as a data communication terminal, audio communication terminal, camera, image communication terminal, packet communication terminal and so on as mentioned above. Thus, it is necessary to employ a complex control method such as the one described above to select an antenna according to such usages. In addition, such a device has to be small in size for use as a mobile phone. For those reasons, even if a terminal has a plurality of antennas, when the terminal is used in close contact with the human body such as for voice call, it could be difficult to reduce SAR unless transmission output itself is reduced for any antenna at any position selected. Thus, in such a case, with the method disclosed by Japanese Unexamined Patent Publication No. 2003-283393, it is necessary to select an antenna that is designed to limit transmission output in order to maintain preferable SAR properties. In this case, degradation of communication speed and quality of the mobile phone has to be accepted.

On the other hand, a laptop PC or handheld PC does not have so many usages as a mobile phone. In addition, size of such mobile terminal devices for use as a terminal is less restricted. With these features, control could become too complex if the antenna control method for a mobile phone terminal device described above is applied to a laptop PC or a handheld PC without modification. To realize such complex control, many devices such as sensors are required for detecting how the terminal device is used. As a result, the mechanism of a mobile terminal device itself becomes complex and there would be more causes of trouble accordingly. In addition, when an antenna with its output limited low is selected, communication speed or quality of the mobile terminal device degrades.

In view of such circumstances, it is desirable to provide a method for controlling antennas without degrading communication speed or quality of a mobile terminal device such as a laptop PC and a handheld PC as well as a mobile terminal device having such control means.

SUMMARY OF THE INVENTION

The present invention provides a method for controlling a plurality of antennas of a mobile terminal device, comprising determining the usage of the mobile terminal device, determining an antenna to be disabled among the plurality of antennas according to the usage that is determined by the determination of usage, and disabling the antenna disabling of which is determined by determination of an antenna to be disabled, wherein the determining of usage determines usage based on the display orientation of the display unit of the mobile terminal device.

Alternatively, the determining of usage determines usage based on the orientation of holding the mobile terminal device that is detected by a holding orientation sensing unit of the mobile terminal device.

Alternatively, the determining of usage determines usage based on installation status detected by an installation status sensing unit of the mobile terminal device.

According to the invention, an antenna to be disabled is determined as appropriate from among a plurality of antennas provided in accordance with the usage of a mobile terminal device. The usage of the mobile terminal device is determined based on display orientation on the display unit, the orientation of holding the device, and combination of them and installation status. The output of the plurality of antennas provided need not be necessarily reduced. The method according to the invention controls antennas of a laptop PC or a handheld PC appropriately, for example.

According to the method of the invention, antennas of a mobile terminal device can be controlled so as to reduce SAR on the human body without degrading communication speed or quality. For example, the method can control SAR adequately on a laptop PC or a handheld PC among others.

For a better understanding of the present invention, together with other and further features and advantages thereof, reference is made to the following description, taken in conjunction with the accompanying drawings, and the scope of the invention will be pointed out in the appended claims.

DETAILED DESCRIPTION OF THE INVENTION

A preferred embodiment of the present invention will be described with respect to drawings.

Figure 1:
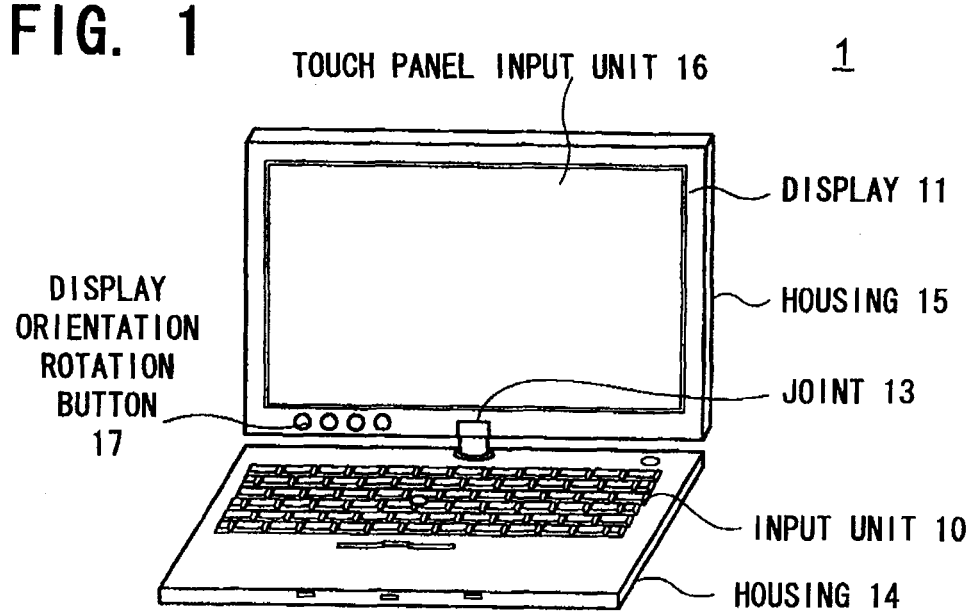
FIG. 1 generally illustrates a physical configuration of a mobile terminal device 1 according to an example of a preferred embodiment of the invention.
Figure 2:
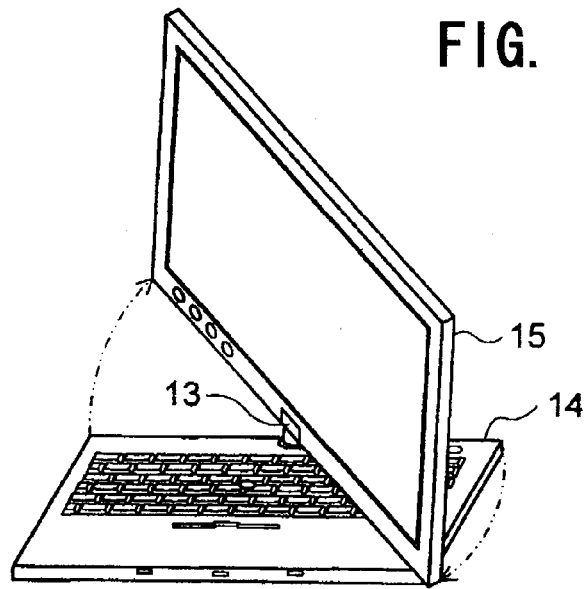
FIG. 2 illustrates movement of a housing of the mobile terminal device 1 according to an example of the preferred embodiment of the invention.
Figure 3:
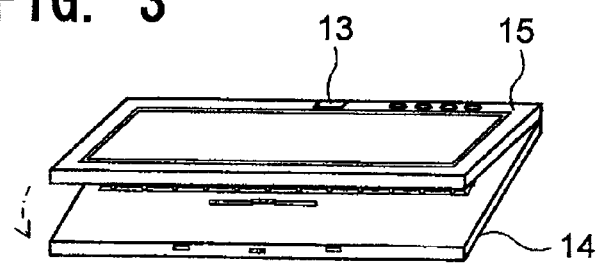
FIG. 3 illustrates movement of a housing of the mobile terminal device 1 according to an example of the preferred embodiment of the invention.

FIG. 1 generally illustrates a configuration of a mobile terminal device 1 according to an example of a preferred embodiment of the invention. The mobile terminal device 1 has two housings 14 and 15 that are approximately rectangular parallelpipeds. The housing 14 has an input unit 10, and the housing 15 has a display unit 11. Further, the housings 14 and 15 are connected by a joint unit 13 at a point at the center of their edge, and can be moved in the direction of opening/closing the housings. The housing 15 can be rotated at least 180° with the housing 15 perpendicular to the housing 14. Thus, the mobile terminal device 1 may be used as a usual laptop PC as shown in FIG. 1, or as a handheld PC that has a touch panel input unit 16 and the like by rotating the housing 15 at the joint unit 13 as shown in FIG. 2 and folding the housing 15 with the display unit onto the housing 14 that has the input unit 10 as illustrated in FIGS. 3 and 4.

Here, a laptop PC is not limited to such one shown in FIG. 1, but it may be a so-called portable personal computer that has parts such as a CPU, memory, hard disk device, keyboard, display panel and the like. Also, a handheld PC is not limited to such one shown in FIG. 4, but it may be a so-called portable computer or an information processing terminal that also has a CPU, memory, hard disk device, touch panel, pen input panel or display panel as input means. Further, devices falling within categories called electronic organizer or PDA may be also included. Also, the terminal device may include a keyboard as input means.

Figure 4:
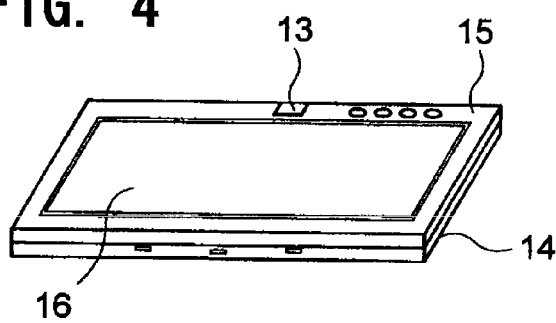
FIG. 4 illustrates movement of a housing of the mobile terminal device 1 according to an example of the preferred embodiment of the invention.
Figure 5:
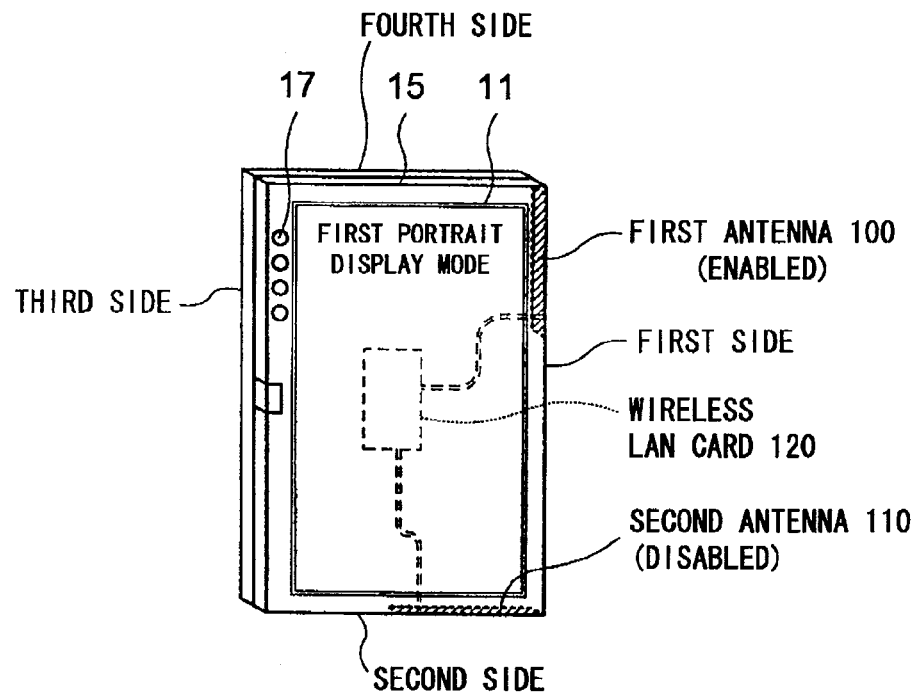
FIG. 5 illustrates the relation between the display orientation of the display unit 11 and antenna control of the mobile terminal device 1 according to an example of the preferred embodiment of the invention.

As shown in FIG. 5, the mobile terminal device 1 has a first antenna 100 and a second antenna 110 on each of two sides of the housing 15 that supports the display unit 11. These antennas are connected to a wireless LAN card 120 and the antennas and the LAN card operate in cooperation to realize communication means of the mobile terminal device 1. The mobile terminal device 1 further includes a display orientation rotation button 17 on the same surface as the display unit 11 of the housing 15 that supports the display unit 11. By pressing the button 17, a user can change the orientation of display on the display unit 11 by a predetermined angle, e.g., 90° and 180°. The display orientation rotation button 17 may be provided at any position on the housings of the mobile terminal device 1 as long as it may be operated both when the terminal device 1 is used as a laptop PC (FIG. 1, for example) and as a handheld PC (FIG. 4, for example).

Further, the display orientation of the display unit 11 may be automatically changed based on the difference in positional relationship of the two housings for the case the terminal is used as a laptop PC as shown in FIG. 1 and the case it is used as a handheld PC as shown in FIG. 4.

FIG. 5 illustrates the display orientation of the mobile terminal device 1 in a first portrait display mode. In an example of the preferred embodiment of the invention, in this display mode, it is determined that the second antenna 110 that is positioned lower relative to the display orientation is closer to the user's body, and the second antenna 110 is disabled in consideration of the way the user holds the terminal device 1.

Figure 6:
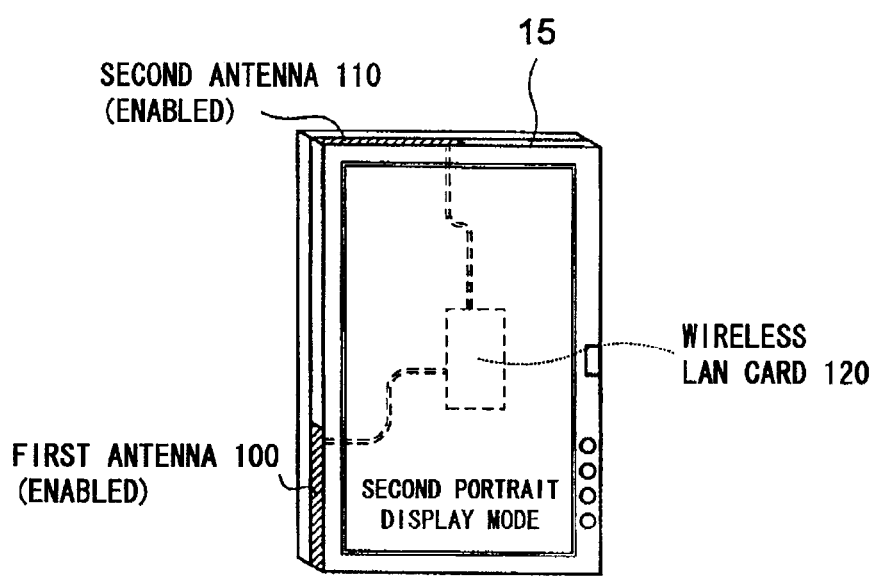
FIG. 6 illustrates the relation between the display orientation of the display unit 11 and antenna control of the mobile terminal device 1 according to an example of the preferred embodiment of the invention.

FIG. 6 illustrates the display orientation of the mobile terminal device 1 in a second portrait display mode. The display orientation in this mode is shifted 180° from the first portrait display mode shown in FIG. 5. The user of the mobile terminal device 1 can switch between these display modes by pressing the display orientation rotation button 17. In an example of the preferred embodiment of the invention, in this display mode, it is determined that both the first antenna 100 and second antenna 110 are away from the user's body and both the antennas are enabled considering the way the user holds the terminal device 1. In this case, an antenna with better use conditions is selected for use by a known method conventionally employed.

Figure 7:
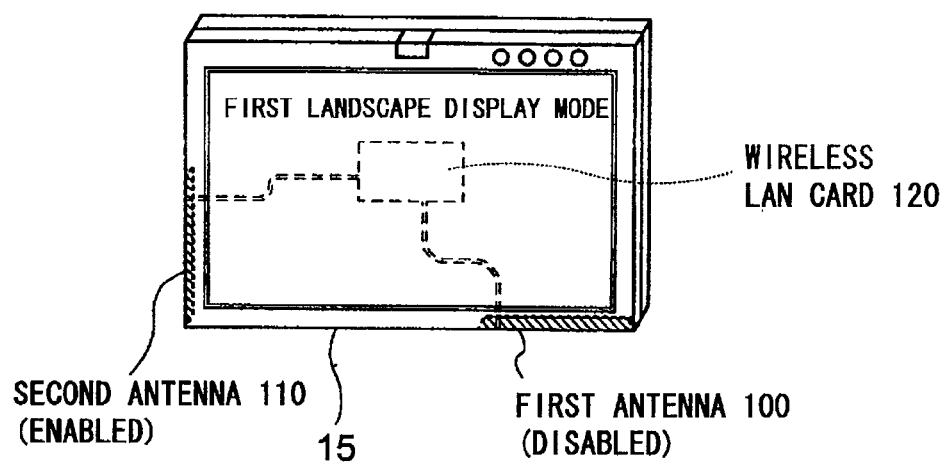
FIG. 7 illustrates the relation between the display orientation of the display unit 11 and antenna control of the mobile terminal device 1 according to an example of the preferred embodiment of the invention.
Figure 8:
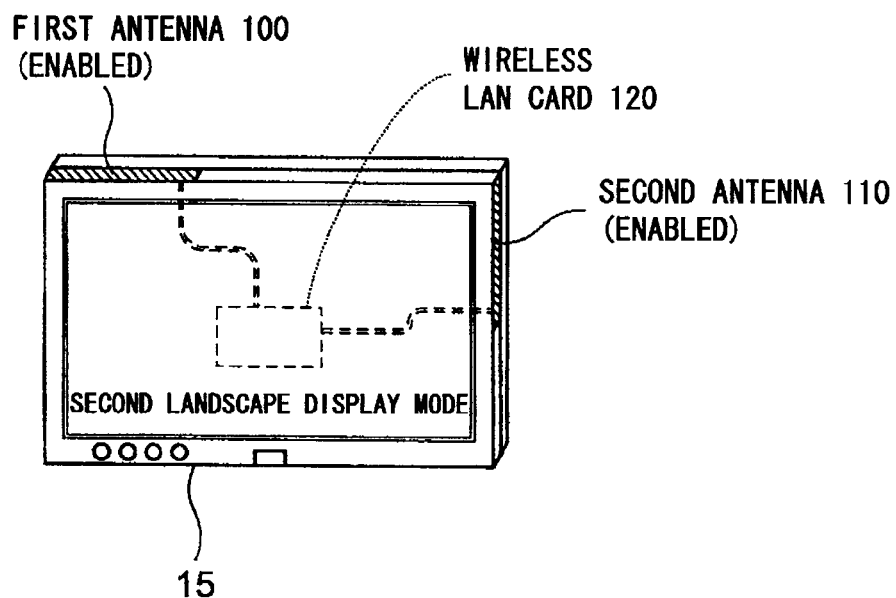
FIG. 8 illustrates the relation between the display orientation of the display unit 11 and antenna control of the mobile terminal device 1 according to an example of the preferred embodiment of the invention.

Further, as illustrated in FIG. 7, in a first landscape display mode of the mobile terminal device 1, the first antenna 100 positioned lower relative to the display orientation is considered to be closer to the user's body considering how the user holds the terminal device 1, and the first antenna 100 is disabled. When in a second landscape display mode of the mobile terminal device 1 as shown in FIG. 8, it is determined that both the first antenna 100 and second antenna 110 are away from the user's body considering how the user holds the terminal device 1, and both the antennas are enabled. In this case, an antenna with better use conditions is selected for use by a known method conventionally employed.

Thus, according to the invention, an antenna positioned lower relative to display orientation is considered to be closer to the user's body and can be automatically disabled taking into consideration how the user holds the terminal. Consequently, an antenna closer to the hand or body of the user holding the mobile terminal device 1 is disabled and only an antenna farther from the user's hand or body is enabled, so that SAR on the human body can be minimized while the user can use wireless communication all the time.

Alternatively, an acceleration sensor may be included in the housing of the mobile terminal device 1 and any of the four usages shown in FIGS. 5-8 may be determined from the orientation of holding the terminal that is detected by the acceleration sensor. Specifically, if an antenna exists on a side that is determined to be positioned downmost among the four sides of the housing, it is determined that the antenna is closer to the user's body and is disabled. In this case, the determination can be made without using information on the display orientation on the display unit 11.

Further, the display orientation of the display unit may be automatically changed according to the determination of the vertical relationship of the housings. This allows the display orientation of the display unit 11 to be changed and an antenna more suitable for the display orientation to be selected without the user pressing the display orientation rotation button 17 whenever the user changes the way of holding the mobile terminal device 1.

Also, when the mobile terminal device 1 is connected to a docking station (i.e., used as a laptop PC), the connection may be detected by a sensor, and both the first and second antennas 100 and 110 may be enabled regardless of the display orientation by the instruction for the terminal detected by an acceleration sensor. In this case, an antenna with better use conditions would be selected for use by a known method conventionally employed.

Figure 9:
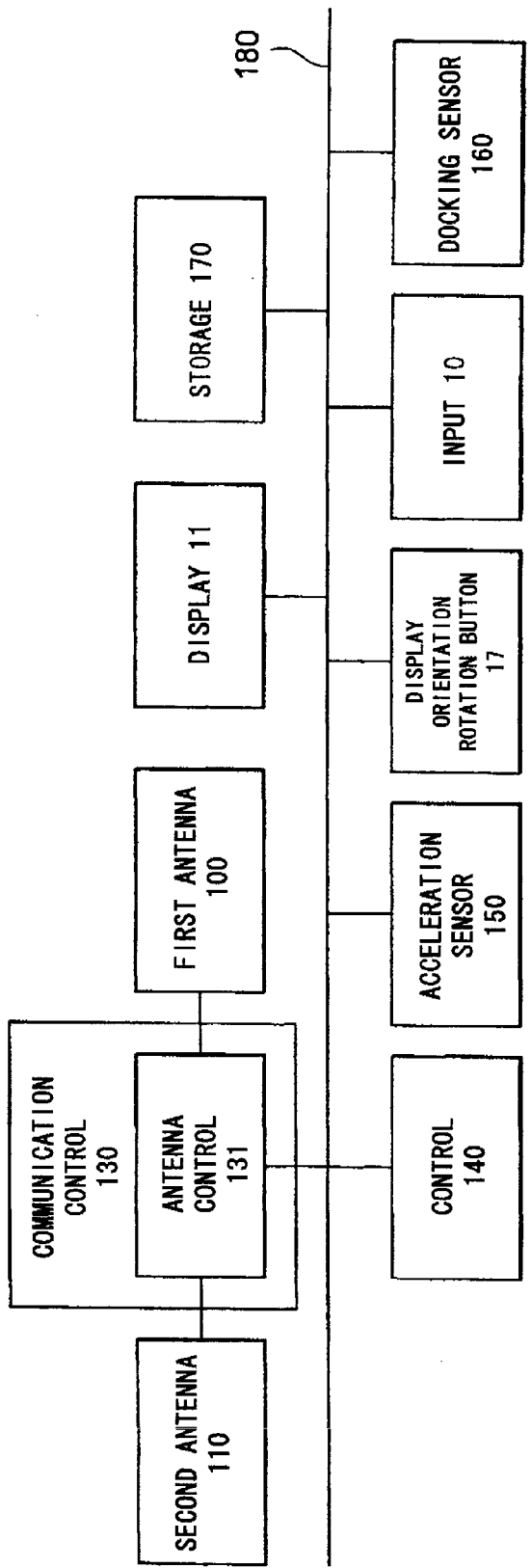
FIG. 9 shows a hardware configuration of the mobile terminal device 1 according to an example of the preferred embodiment of the invention.

FIG. 9 illustrates a hardware configuration of the mobile terminal device 1 of the invention. A control unit 140 controls the entire mobile terminal device 1. The mobile terminal device 1 also has a communication control unit 130 that includes an antenna control unit 131 for controlling the first and second antennas 100 and 110. The antenna control unit 131 determines an antenna to be disabled and stops the use of the antenna according to the determination as described earlier.

The mobile terminal device 1 may include an acceleration sensor 150. The mobile terminal device may also include a docking sensor 160 for detecting whether the terminal device 1 is connected to a docking station. Using detection result by these sensors, the antenna control unit 131 controls the antennas in cooperation with the control unit 140 as mentioned above. These pieces of hardware are interconnected by a bus 180. Programs stored in a storage unit 170 are read out and executed as necessary by the control unit 140, causing the pieces of hardware to cooperate to realize the various means of the invention.

As can be readily appreciated by those skilled in the art, the acceleration sensor 150 is available in various mechanisms, such as one that is combination of piezoelectric ceramic device and electrodes. When acceleration (gravitational acceleration in resting state, for example) is externally applied to the piezoelectric ceramic devices, the piezoelectric ceramic devices distort to generate stress internally. The stress is converted to electric signal (electric charge) with piezoelectric effect and the direction and magnitude of the acceleration can be detected from the electric signal. This allows the direction of the gravitational acceleration to be detected in resting state, and the orientation in which the mobile terminal device 1 is held can be calculated from the direction.

Figure 10:
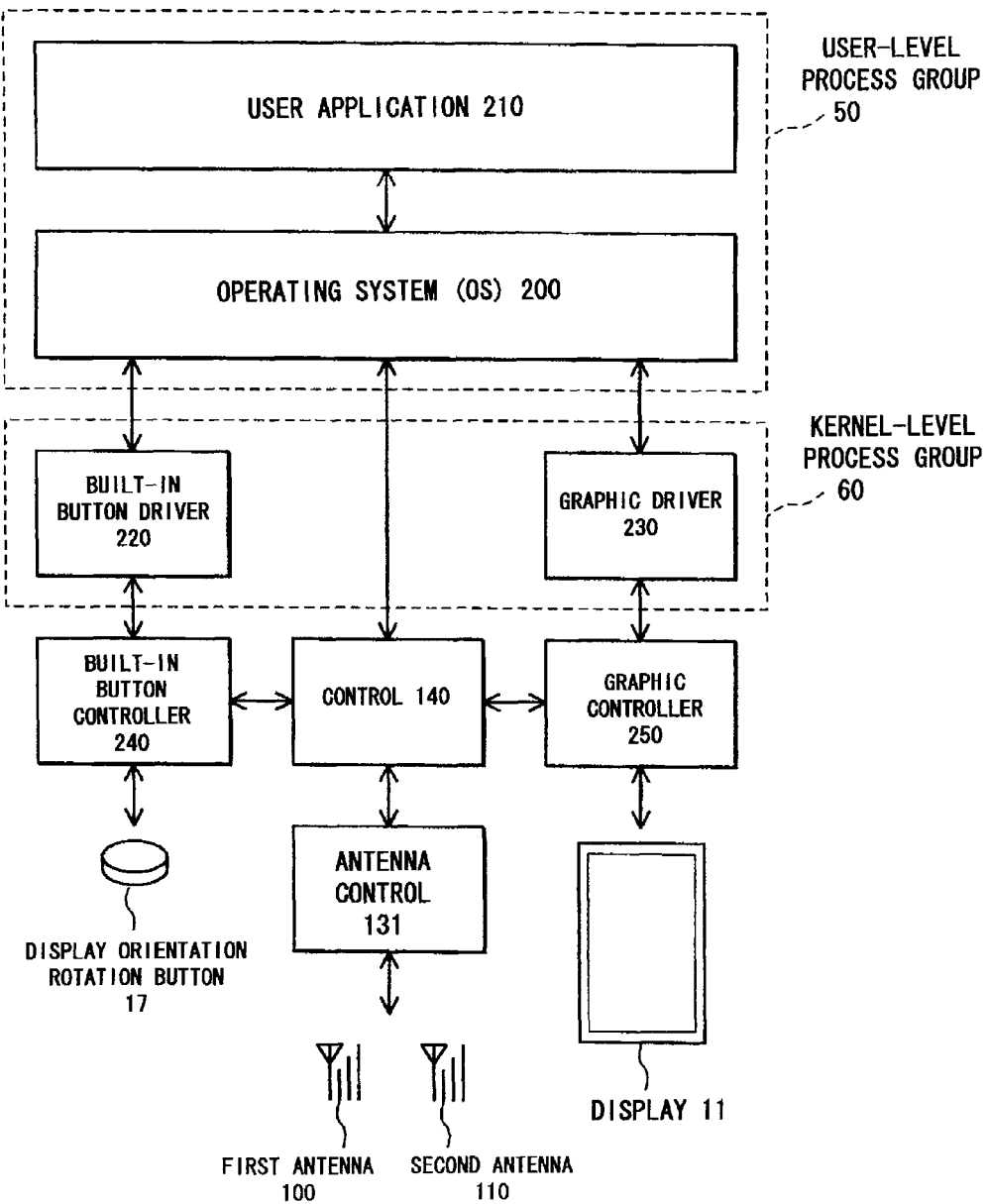
FIG. 10 shows a functional configuration of the mobile terminal device 1 according to an example of the preferred embodiment of the invention.

FIG. 10 illustrates a functional configuration of the mobile terminal device 1 according to an example of the preferred embodiment of the invention. The control unit 140 controls the entire mobile terminal device 1. The control unit 140 provides various functions of the mobile terminal device 1 in conjunction with the antenna control unit 131 for controlling the first and second antennas 110 and 110, a built-in button controller 240 for controlling built-in buttons such as the display orientation rotation button 17, and a graphic controller 250 for controlling the display unit 11. On an operating system (OS) 200, various user applications such as a word processor can run. The OS 200 drives various pieces of hardware via the control unit 140, antenna control unit 131, built-in button controller 240, and graphic controller 250 by way of kernel-level process groups that consist of a built-in button driver 220, a graphic driver 230 and the like.

In an example of the preferred embodiment of the invention, when the user presses the display orientation rotation button 17 of the mobile terminal device 1, the built-in button controller 240 senses the pressing. The built-in button controller 240 then informs the OS 200 of the pressing via the built-in button driver 220. The OS 200 sends a command for rotating the screen by a predetermined rotation angle (e.g., 90°) to the graphic controller 250 via the graphic driver 230. The graphic controller 250 receives the command and rotates the display orientation of the display unit 11 (e.g., 90°) accordingly. Further, upon detecting the pressing of the display orientation rotation button via the OS 200 and the like, the control unit 140 confirms the display orientation of the display unit 11 to the OS 200. The OS 200 obtains information on display orientation from the graphic controller 250 via the graphic driver 230. The control unit 140 obtains the information on display orientation from the OS 200, determines whether to disable/enable the first and/or second antennas based on the information on display orientation, and executes the determination via the antenna control unit 131.

Figure 11:
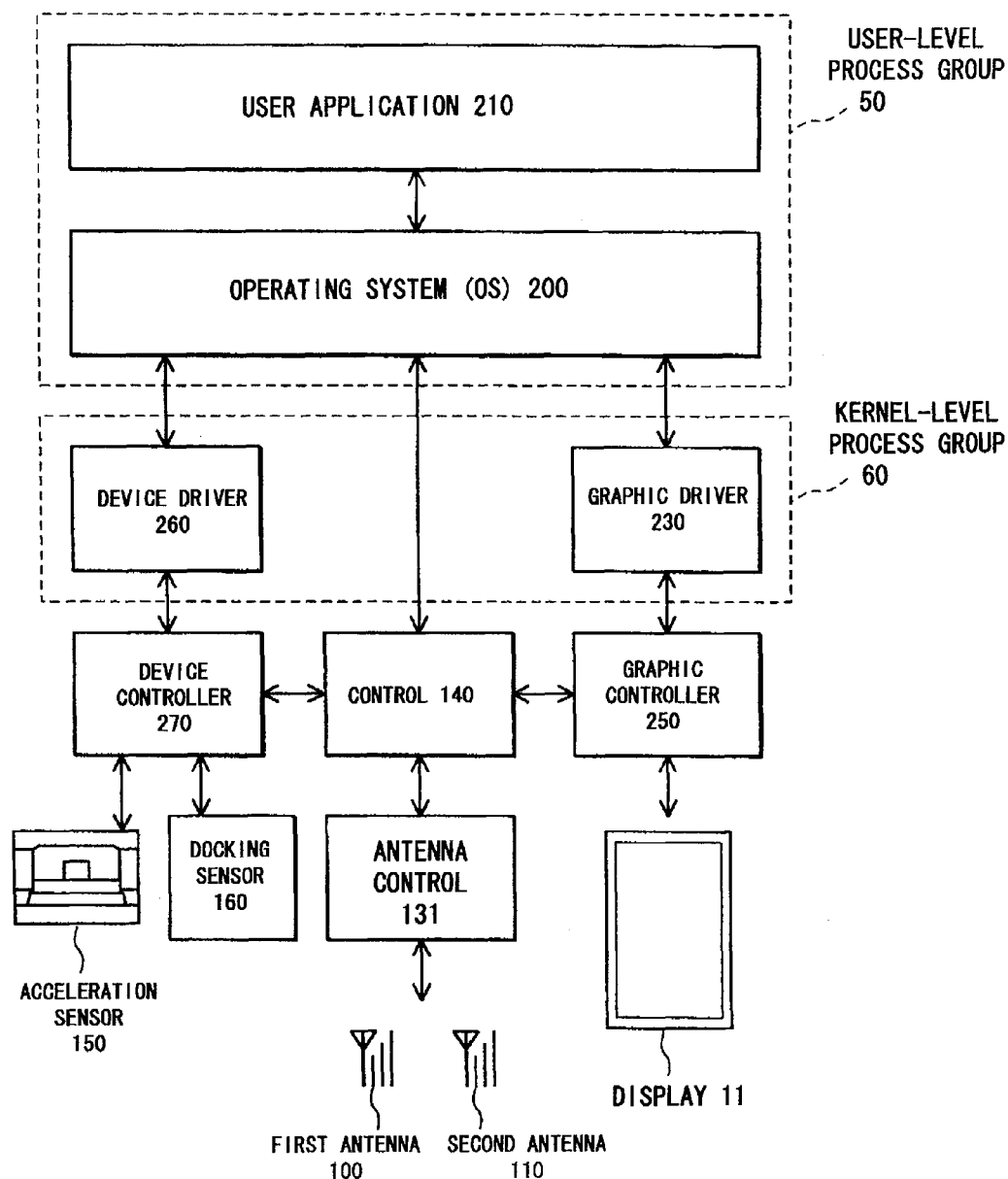
FIG. 11 shows a functional configuration of the mobile terminal device 1 according to another example of the preferred embodiment of the invention.

FIG. 11 illustrates a functional configuration of the mobile terminal device 1 according to another example of the preferred embodiment of the invention. As in FIG. 10, the control unit 140 controls the entire mobile terminal device 1. The control unit 140 provides various functions of the mobile terminal device 1 in conjunction with the antenna control unit 131 for controlling the first and second antennas 100 and 110, a device controller 270 for controlling the acceleration sensor 150 and docking sensor 160, and a graphic controller 250 for controlling the display unit 11. On the operating system (OS) 200, various user applications such as a word processor can run. The OS 200 drives various pieces of hardware via the control unit 140, antenna control unit 131, device controller 270, and graphic controller 250 or the like, by way of kernel-level process groups that consist of the device driver 260 and graphic driver 230.

In another example of the preferred embodiment of the invention, when the user changes the orientation of holding the terminal, the acceleration sensor 150 detects the change. When the change in holding orientation is detected, the change is informed to the OS 200 via the device driver 260. The control unit 140 is informed of the change by the OS 200, and based on the information on the change, determines whether to disable/enable the first and/or second antennas and executes the determination via the antenna control unit 131.

Further, in yet another example of the preferred embodiment of the invention, the docking sensor 160 senses the connection of the mobile terminal device 1 to a docking station (not shown). In this case, as with the acceleration sensor 150, the control unit 140 recognizes the connection and changes the display orientation of the display unit 11 to the second landscape display mode shown in FIG. 8 via the graphic controller 250. Further, the control unit 140 enables both the first and second antennas via the antenna control unit 131. Here, an antenna with better use conditions is selected for use by a known method conventionally employed.

Figure 12:
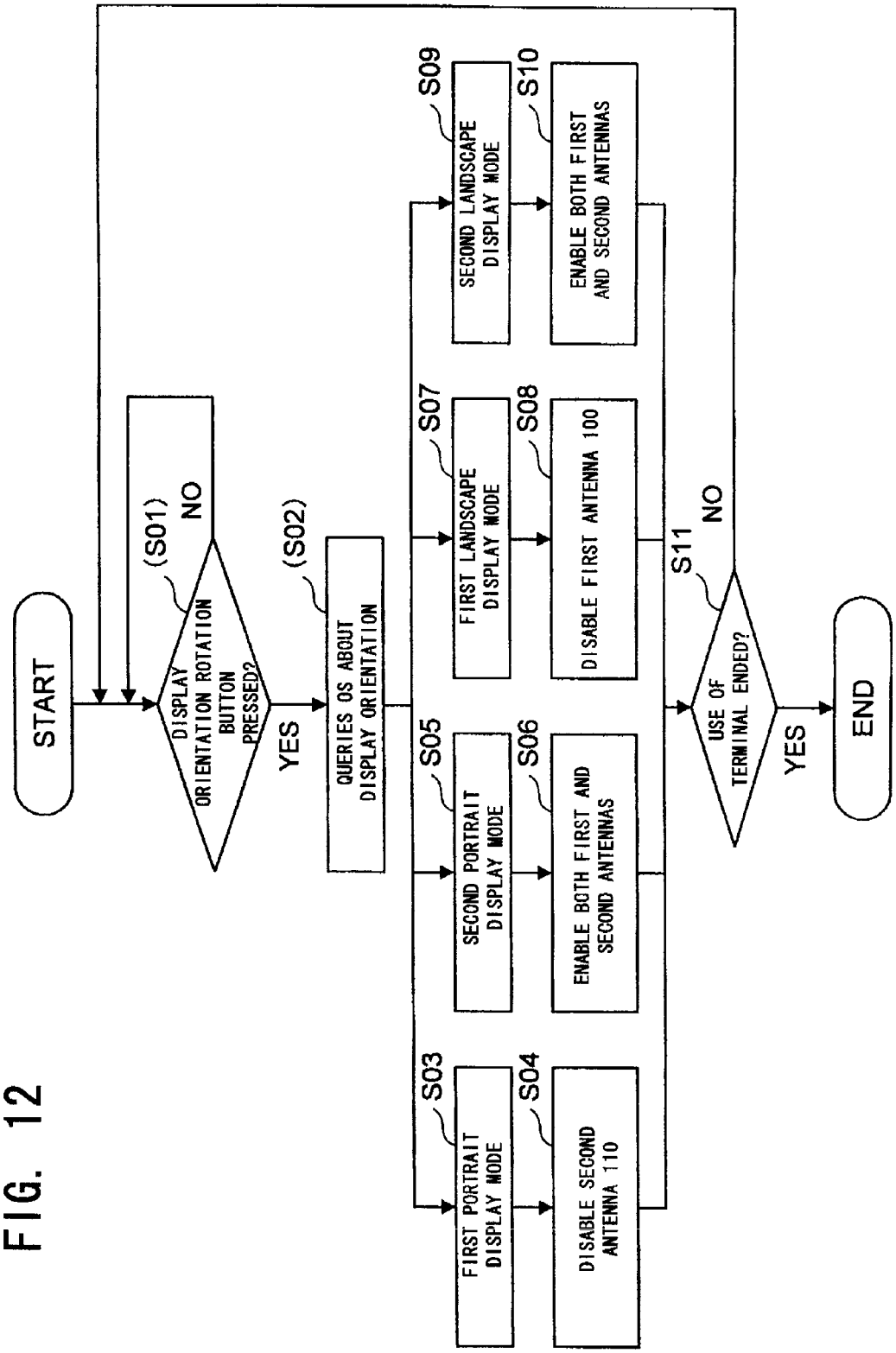
FIG. 12 is a flow diagram illustrating the flow of antenna control according to an example of the preferred embodiment of the invention.

FIG. 12 is a flow diagram illustrating the flow of antenna control according to an example of the preferred embodiment of the invention. First, the control unit 140 determines whether or not the display orientation rotation button 17 has been pressed (step S01). If it determines that the button has been pressed, the control unit 140 queries the OS (operating system) running on the mobile terminal device 1 about the display orientation of the display unit 11 (step S02).

If the query returns the first portrait display mode shown in FIG. 5 (step S03), the antenna control unit 131 disables the second antenna 110 (step S04). On the other hand, the query returns the second portrait display mode shown in FIG. 6 (step S05), the antenna control unit 131 enables both the first and second antennas 100 and 110 (step S06). In the latter case, an antenna with better use conditions is selected for use by a known method conventionally employed.

If the query returns the first landscape display mode shown in FIG. 7 (step S07), the antenna control unit 131 disables the first antenna 100 (step S08). If the query returns the second landscape display mode shown in FIG. 8 (step S09), the antenna control unit 131 enables both the first and second antennas 100 and 110 (step S10). In the latter case, an antenna with better use conditions is selected for use by a known method conventionally employed.

In this manner, control starting from step S01 is repeated until the use of the mobile terminal device ends (step S11).

Figure 13:
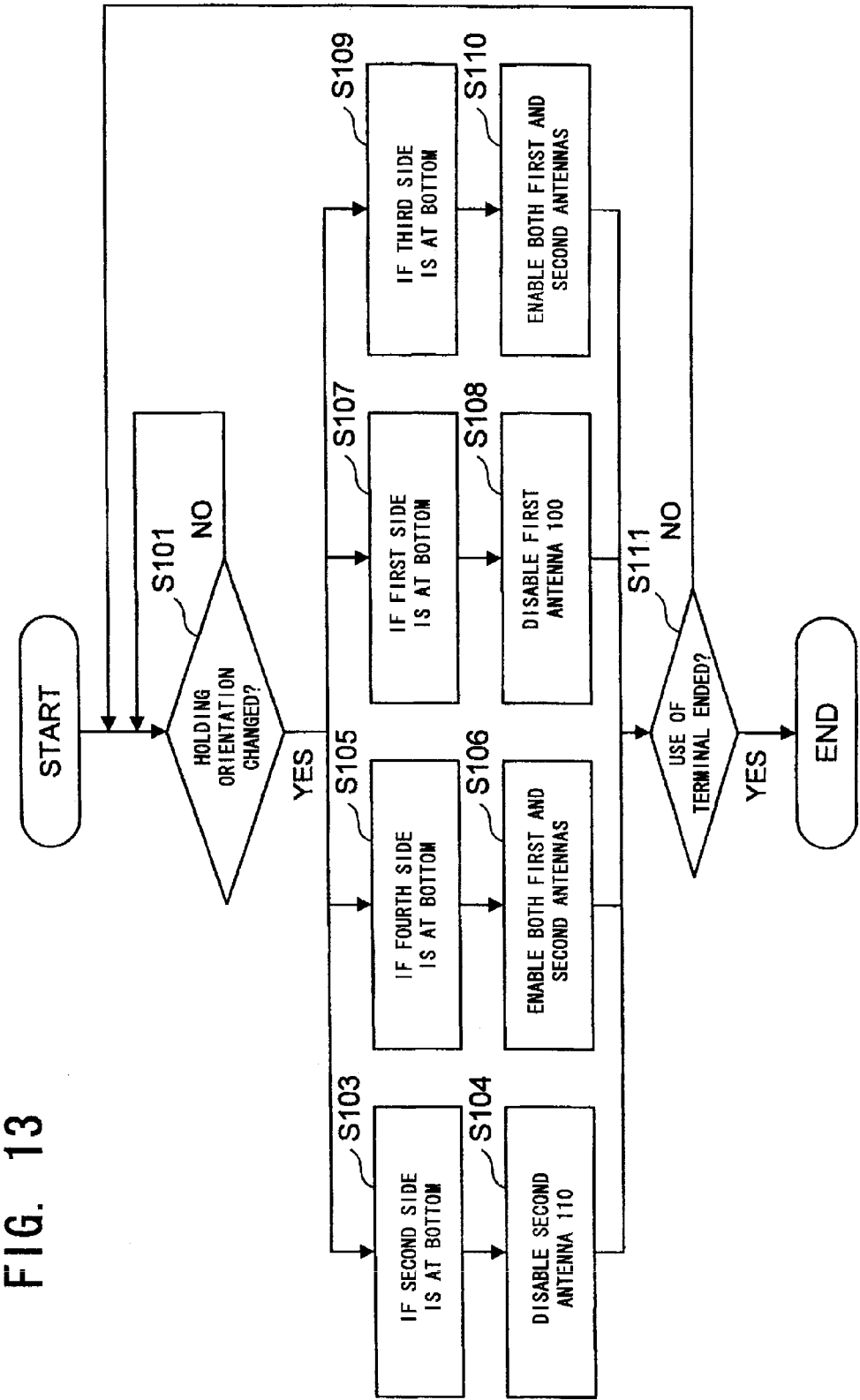
FIG. 13 is a flow diagram illustrating the flow of antenna control according to an example of the preferred embodiment of the invention.

FIG. 13 is a flow diagram illustrating the flow of antenna control according to another example of the preferred embodiment of the invention. First, the control unit 140 determines whether or not the holding orientation of the mobile terminal device 1 has changed (step S101). Then, if the control unit 140 determines that the holding orientation has changed and that the second side shown in FIG. 5 is at the bottom (step S103), the antenna control unit 131 disables the second antenna 110 (step S104). Meanwhile, if the control unit 140 determines that the holding orientation has changed and that the fourth side shown in FIG. 5 is at the bottom (step S105), the antenna control unit 131 enables both the first and second antennas 100 and 110 (step S106). In the latter case, an antenna with better use conditions is selected for use by a known method conventionally employed.

If the control unit 140 determines that the holding orientation has changed and that the first side shown in FIG. 5 is at the bottom (step S107), the antenna control unit 131 disables the first antenna 100 (step S108). If the control unit 140 determines that the holding orientation has changed and that the third side shown in FIG. 5 is at the bottom (step S109), the antenna control unit 131 enables both the first and second antennas 100 and 110 (step S110). In the latter case, an antenna with better use conditions is selected for use by a known method conventionally used.

Control starting at step S01 is repeated in such a manner until the use of the mobile terminal device ends (step S111).

Figure 14:
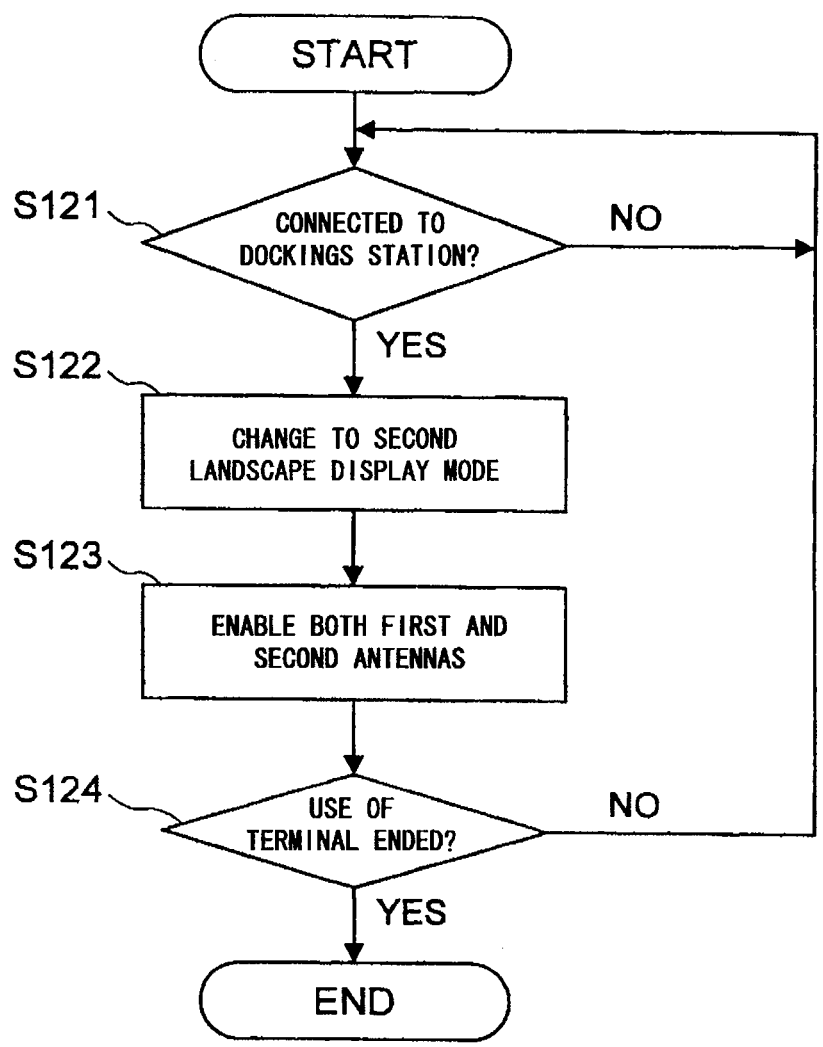
FIG. 14 is a flow diagram illustrating the flow of antenna control according to an example of the preferred embodiment of the invention.

FIG. 14 is a flow diagram illustrating the flow of antenna control according to yet another example of the preferred embodiment of the invention. Initially, the control unit 140 determines whether or not the mobile terminal device 1 has been connected to a docking station (step S121). If the control unit 140 determines that the terminal is connected to the docking station, the control unit 140 changes the display orientation of the display unit 11 to the second landscape display mode of FIG. 8 (step S122), and the antenna control unit 131 enables both the first and second antennas 100 and 110 (step S123). Here, an antenna with better use conditions is selected for use by a known method conventionally employed.

Control starting at step S121 is repeated in such a manner until use of the mobile terminal device ends (step S124).

Although the above embodiments describes a case where the mobile terminal device 1 has two antennas, if the terminal device has three or more antennas, any antenna that is positioned lower relative to the display orientation of the display unit can be disabled in the same way. Also, any antenna that is positioned downmost as determined by an acceleration sensor can be disabled in the same way as described above.

Also, although use of an antenna with its transmission output reduced is not necessarily required in the preferred embodiment of the invention, the invention is not intended to deny the use of such an antenna. For example, it is also possible that the terminal device has more antennas and transmission output of some of the antennas is reduced.

If not otherwise stated herein, it is to be assumed that all patents, patent applications, patent publications and other publications mentioned and cited herein are hereby fully incorporated by reference herein as if set forth in their entirety herein.

While the embodiment of the present invention has been described, the description only illustrates specific examples and does not limit the invention particularly. Also, the operation mentioned in the embodiment of the invention only illustrates specific examples and the operation provided by the present invention is not limited to that described in the embodiment of the invention.

What is claimed is:

1. A method comprising:
determining a first use condition based on a first display housing position of a mobile terminal device having a first antenna in a first side of the display housing and a second antenna in a second side of the display housing, wherein the first antenna and the second antenna are positioned substantially perpendicular to one another;
determining a second use condition based on a second display housing position;
determining an antenna of the first antenna and the second antenna to be disabled based on the first display housing position;
disabling the antenna to be disabled based on the first display housing position; and
using, in the second display housing position, both the first antenna and the second antenna.

2. The method according to claim 1, wherein the determining an antenna to be disabled further comprises determining which antenna of the plurality of antennas is closest to the user and selecting the antenna which is closest to the user as the antenna to be disabled.

3. The method according to claim 2, wherein the antenna that is closest to the user is determined based upon a display housing position.

4. The method according to claim 2, wherein the antenna that is closest to the user is determined based upon an orientation of holding the mobile terminal device as detected by a holding orientation sensing unit of the mobile terminal device.

5. The method according to claim 2, wherein:
the antenna that is closest to the user is determined based upon a combination of a display housing position and an orientation of holding the mobile terminal device as detected by a holding orientation sensing unit of the mobile terminal device; and
after the antenna to be disable is disabled, the device produces an acceptable specific absorption rate.

6. The method according to claim 1, wherein the mobile terminal device is a laptop PC.

7. An apparatus comprising:
a display housing comprising:
a first antenna in a first side of the display housing and a second antenna in a second side of the display housing, wherein the first antenna and the second antenna are positioned substantially perpendicular to one another; and
a control unit that:
determines a first use condition based on a first display housing position;
determines a second use condition based on a second display housing position;
determines an antenna of the first antenna and the second antenna to be disabled based on the first display housing position; and
disables the antenna to be disabled based on the first display housing position; and
uses, in the second display housing position, both the first antenna and the second antenna.

8. The apparatus according to claim 7, further comprising:
an acceleration sensor that determines if either the first antenna or the second antenna is positioned downmost;
wherein if the first antenna is positioned downmost, the first antenna is disabled; and
wherein if the second antenna is positioned downmost, the second antenna is disabled.

9. The apparatus according to claim 7, wherein said apparatus is a laptop PC.

10. The apparatus according to claim 7, wherein the apparatus is a handheld PC.

11. The apparatus according to claim 7, further comprising:
a holding orientation sensing unit, wherein the holding orientation sensing unit detects usage of the apparatus based on an orientation of holding said apparatus by a user.

12. The apparatus according to claim 7, wherein the first and second display housing positions are associated with at least one a display orientation, the display orientation being selected from the group consisting of a portrait display and a landscape display.

13. The apparatus according to claim 7, wherein, when the control unit determines that the first antenna and the second antenna are positioned away from the user, the antenna control unit selects an antenna with better use conditions and disable all other antennas.

14. An apparatus comprising:
a display housing;
a first antenna in a first side of the display housing and a second antenna in a second side of the display housing, wherein the first antenna and the second antenna are positioned substantially perpendicular to one another;
a control unit that determines:
a first use condition based on a first display housing position; and
which of the first and second antennas is to be disabled based on determining the first display housing position;
the control unit disabling one of the first and second antennas based on the first display housing position;
determining a second use condition based on a second display housing position; and
using, in the second display housing position, both the first antenna and the second antenna.

15. The apparatus according to claim 14, wherein said apparatus is a laptop PC.

16. The apparatus according to claim 14, wherein the apparatus is a handheld PC.

17. The apparatus according to claim 14, further comprising:
a holding orientation sensing unit, wherein the holding orientation sensing unit detects holding of the apparatus by a user, and wherein an antenna closest to the user holding the apparatus is disabled.

18. The apparatus according to claim 17, wherein the holding orientation sensor comprises a combination of a piezoelectric ceramic device and electrodes.

19. The apparatus according to claim 14, wherein the first and second display housing positions are associated with at least one a display orientation, the display orientation being selected from the group consisting of a portrait display and a landscape display.

20. The apparatus according to claim 14, wherein, when the control unit determines that a plurality of the one or more antennas are positioned away from the user, the control unit selects an antenna from the plurality of antennas with better use conditions and disable all other antennas.

* * * * *